(12) United States Patent
Lee et al.

(10) Patent No.: US 12,457,542 B2
(45) Date of Patent: Oct. 28, 2025

(54) METHOD AND APPARATUS FOR VERIFYING COMPLIANCE WITH UE ROUTE SELECTION POLICY

(71) Applicant: Samsung Electronics Co., Ltd., Suwon-si (KR)

(72) Inventors: Jicheol Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 17/976,002

(22) Filed: Oct. 28, 2022

(65) Prior Publication Data

US 2023/0136984 A1 May 4, 2023

(30) Foreign Application Priority Data

Oct. 29, 2021 (KR) .......................... 10-2021-0147330

(51) Int. Cl.
*H04W 40/24* (2009.01)
*H04W 80/10* (2009.01)

(52) U.S. Cl.
CPC ............ *H04W 40/24* (2013.01); *H04W 80/10* (2013.01)

(58) Field of Classification Search
None
See application file for complete search history.

(56) References Cited

U.S. PATENT DOCUMENTS

| | | | |
|---|---|---|---|
| 7,944,813 B1 * | 5/2011 | Hurtta | H04L 65/1069 |
| | | | 709/239 |
| 2020/0336947 A1 | 10/2020 | Lee et al. | |
| 2021/0037380 A1 | 2/2021 | Lee et al. | |
| 2021/0045033 A1 * | 2/2021 | Sun | H04W 8/20 |
| 2021/0243664 A1 | 8/2021 | Huang-Fu et al. | |
| 2021/0258868 A1 * | 8/2021 | Wong | H04W 4/029 |
| 2021/0337456 A1 | 10/2021 | Huang-Fu | |

(Continued)

FOREIGN PATENT DOCUMENTS

| KR | 10-2018-0123364 A | 11/2018 |
|---|---|---|
| WO | 2019/194633 A1 | 10/2019 |

(Continued)

OTHER PUBLICATIONS

3GPP: 3rd Generation Partnership Project: Technical Specification Group Services and System Aspects; Policy and charging control framework for the 5G System (5GS): Stage 2 (Release 17): 3GPP TS 23.503; V17.2.0; (Sep. 2021); Sep. 24, 2021; Valbonne, France.

(Continued)

*Primary Examiner* — Xavier S Wong
(74) *Attorney, Agent, or Firm* — Jefferson IP Law, LLP

(57) ABSTRACT

A method performed by a user equipment-policy control function (UE-PCF) entity in a wireless communication system is provided. The method includes receiving, from a user equipment (UE) via an access management function (AMF) entity, UE policy information including UE route selection policy (URSP) compliance capability indicator (UCCI), determining whether to perform a URSP compliance verification procedure, based on the UE policy information, and performing the URSP compliance procedure based on the determining.

10 Claims, 11 Drawing Sheets

(56) References Cited

U.S. PATENT DOCUMENTS

2022/0110023 A1\* 4/2022 Wu ...................... H04W 40/02
2022/0264423 A1\* 8/2022 Lin ...................... H04W 8/183

FOREIGN PATENT DOCUMENTS

WO 2020/205725 A1 10/2020
WO 2021/163590 A1 8/2021

OTHER PUBLICATIONS

International Search Report with Written Opinion dated Feb. 10, 2023; International Appln. No. PCT/KR2022/016725.
European Search Report dated Feb. 11, 2025, Issued in a European Application No. 22887708.4.
Extended European Search Report dated Sep. 9, 2025, issued in European Patent Application No. 25187829.4.

\* cited by examiner

METHOD AND APPARATUS FOR VERIFYING COMPLIANCE WITH UE ROUTE SELECTION POLICY

CROSS-REFERENCE TO RELATED APPLICATION(S)

This application is based on and claims priority under 35 U.S.C. § 119(a) of a Korean patent application number 10-2021-0147330, filed on Oct. 29, 2021, in the Korean Intellectual Property Office, the disclosure of which is incorporated by reference herein in its entirety.

BACKGROUND

1. Field

The disclosure relates to a wireless communication system. More particularly, the disclosure relates to a method of verifying whether a user equipment (UE) complies with user equipment route selection policy (URSP) in a cellular wireless communication system (5$^{th}$ generation (5G) system).

2. Description of Related Art 5G mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service-based architecture or service-based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Currently, there is no way for a network to verify whether application traffic of a user equipment (UE) complies with a UE route selection policy delivered from the network.

The URSP includes a traffic descriptor and a route selection component (RSC), and when an application or application traffic corresponding to the traffic descriptor is detected, the UE may associate the traffic with a previously-created protocol data unit (PDU) session. Alternatively, when the previously-created PDU session does not include a PDU session satisfying the RSC, the UE may create a new PDU session.

According to the related art, it cannot be identified as to whether an RSC transferred by the URSP is configured when the UE creates the PDU session.

The UE-PCF is aware of URSP rules, and the session management function (SMF) is aware of PDU session parameters corresponding to the RSC. However, the UE-PCF and the SMF are not connected to each other, and even when the SMF receives PDU session parameters requested by the UE, it cannot be identified as to a rule by which the request is made and an application for which the request is made.

Aspects of the disclosure are to address at least the above-mentioned problems and/or disadvantages and to provide at least the advantages described below. Accordingly, an aspect of the disclosure is to provide a method of verifying whether a user equipment (UE) complies with user equipment route selection policy (URSP) in a cellular wireless communication system (5th generation (5G) system).

Additional aspects will be set forth in part in the description which follows and, in part, will be apparent from the description, or may be learned by practice of the presented embodiments.

In accordance with an aspect of the disclosure, a method performed by a user equipment-policy control function (UE-PCF) entity in a wireless communication system is provided. The method includes receiving, from a user equipment (UE) via an access management function (AMF) entity, UE policy information including UE route selection policy (URSP) compliance capability indicator (UCCI), determining whether to perform a URSP compliance verification procedure, based on the UE policy information, and performing the URSP compliance procedure based on the determining.

In accordance with another aspect of the disclosure, a method performed by an access management function (AMF) entity in a wireless communication system is provided. The method includes receiving, from a user equipment (UE), UE policy information including UE route selection policy (URSP) compliance capability indicator (UCCI), transmitting, to a UE-policy control function (UE-PCF) entity, the UE policy information used to determine whether to perform a URSP compliance verification procedure, receiving, from the UE-PCF entity, information including at least one URSP rule based on the URSP compliance verification procedure, and transmitting, to the UE, the information, wherein a URSP rule identifier (URID) is included in the URSP rule.

In accordance with another aspect of the disclosure, a user equipment-policy control function (UE-PCF) entity in a wireless communication system is provided. The UE-PCT entity includes a transceiver, at least one processor coupled with the transceiver and configured to receive, from a user equipment (UE) via an access management function (AMF) entity, UE policy information including UE route selection policy (URSP) compliance capability indicator (UCCI), determine whether to perform a URSP compliance verification procedure, based on the UE policy information, and perform the URSP compliance procedure based on the determining.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
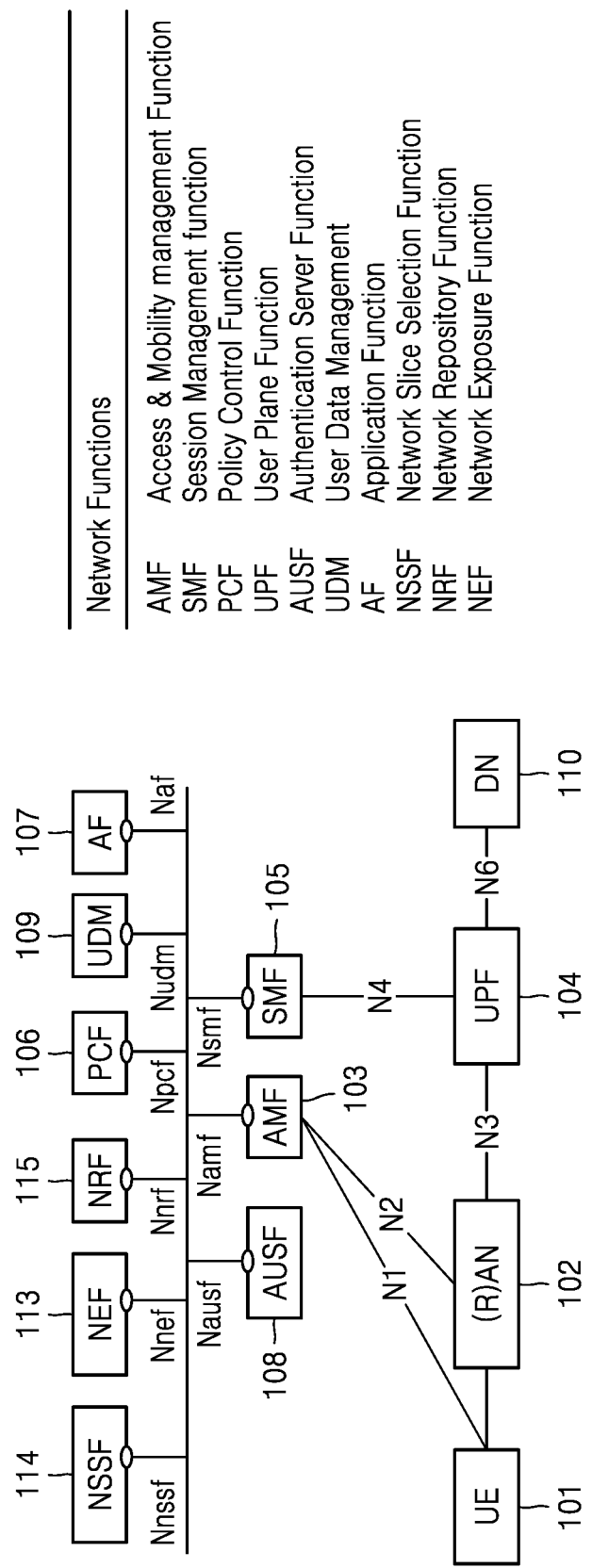
FIG. 1 is a network structure and interface of a 5th generation (5G) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b, or c" indicates only a, only b, only c, both a and b, both a and c, both b and c, all of a, b, and c, or any variations thereof.

Throughout the specification, a layer may also be referred to as an entity.

In the following description, a base station, which is an entity for allocating resources to a terminal, may include at least one of an eNode B, a Node B, a base station (BS), a radio access network (RAN), an access network (AN), a RAN node, a radio access unit, a BS controller, or a node on a network. Examples of the terminal may include a user equipment (UE), a mobile station (MS), a cellular phone, a smartphone, a computer, and a multimedia system capable of performing a communication function. In the disclosure, a downlink (DL) denotes a wireless transmission path of a signal transmitted to a UE from a BS, and an uplink (UL) denotes a wireless transmission path of a signal transmitted to a BS from a UE. Hereinafter, the Long-Term Evolution (LTE) or LTE-Advanced (LTE-A) system is described in an embodiment of the disclosure, but the embodiment of the disclosure may be applied to other communication systems having a similar technical background or channel form. For example, embodiments of the disclosure may be applicable to a system including 5th generation (5G) New Radio (NR) communication technology developed after LTE-A system, and hereinafter, 5G may indicate a concept including LTE, LTE-A, and other similar services according to the related art. Also, it will be understood by one of ordinary skill in the art that embodiments of the disclosure may be applied to other communication systems through some modifications without departing from the scope of the disclosure. Here, it will be understood that combinations of blocks in flowcharts or process flow diagrams may be performed by computer program instructions.

Because these computer program instructions may be loaded into a processor of a general-purpose computer, special purpose computer, or other programmable data processing device, the instructions, which are executed via the processor of the computer or other programmable data processing device generate means for implementing functions specified in the flowchart block(s). Because these computer program instructions may also be stored in a computer usable or computer-readable memory that may direct a computer or other programmable data processing device to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing device, a series of operational steps may be performed on the computer or other programmable device to produce a computer implemented process, and thus the instructions executed on the computer or other programmable device may provide steps for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks illustrated in succession may in fact be executed substantially concurrently, or the blocks may sometimes be executed in a reverse order, depending on the functions involved therein. The term "module" or "-er/or" used in embodiments of the disclosure refers to a software or hardware component, such as a field-programmable gate array (FPGA) or an application-specific integrated circuit (ASIC), which may perform certain tasks. However, the term "module" or "-er/or" is not limited to software or hardware. The term "module" or "-er/or" may be configured in an addressable storage medium or may be configured to reproduce one or more processors. Thus, for example, the term "module" or "-er/or" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. The functionality provided in components and "module" or "-er/or" may be combined into fewer components and "modules" or "-ers/ors" or may be further separated into additional components and "modules" or "-ers/ors". Further, the components and "modules" or "-ers/ors" may be implemented to operate one or more central processing units (CPUs) in a device or a secure multimedia card. Also, according to an embodiment, a "module" or "-er/or" may include one or more processors.

FIG. 1 is a network structure and interface of a 5G system according to an embodiment of the disclosure. A network entity included in the network structure of the 5G system of FIG. 1 may include a network function (NF) according to a system implementation.

Referring to FIG. 1, a network structure of a 5G system 100 may include various network entities. For example, the 5G system 100 may include an authentication server function (AUSF) 108, a (core) access and mobility management function (AMF) 103, a session management function (SMF) 105, a policy control function (PCF) 106, an application function (AF) 107, a unified data management (UDM) 109, a data network (DN) 110, a network exposure function (NEF) 113, a network slicing selection function (NSSF) 114, an edge application service domain repository (EDR) 113, an edge application server (EAS) (not shown), an EAS discovery function (EASDF) (not shown), a user plane function (UPF) 104, a (radio) access network (R)AN 102, and a terminal, i.e., a user equipment (UE) 101.

Each of the NFs of the 5G system 100 may support the functions described below.

The AUSF 108 may process and store data for authentication of the UE 101.

The AMF 103 may provide a function for access and mobility management in units of UE, and one AMF may be connected to one AMF by default. For example, the AMF 103 may support functions, including a signaling between CN nodes for mobility between $3^{rd}$ Generation Partnership Project (3GPP) access networks, termination of a RAN control plane (CP) interface (i.e., an N2 interface), termination of a non-access stratum (NAS) signaling (N1), NAS signaling security (NAS ciphering and integrity protection), access stratum (AS) security control, registration management (registration area management), connection management, idle mode UE reachability (including control and performance of paging retransmission), mobility management control (subscription and policy), support for intra-system mobility and inter-system mobility, support for network slicing, SMF selection, lawful intercept (LI) (for AMF events and interfaces to LI system), providing delivery of session management (SM) messages between the UE and SMF, a transparent proxy for SM message routing, access authentication, access authorization including roaming permission check, providing delivery of SMS messages between the UE and the SMF, a security anchor function (SAF), and/or security context management (SCM). Some or all of functions of the AMF 103 may be supported within a single instance of one AMF.

For example, the DN 110 denotes an operator service, Internet access, or a $3^{rd}$ partyservice. The DN 110 may transmit a DL protocol data unit (PDU) to the UPF 104 or receive a PDU transmitted from the UE 101 from the UPF 104.

The PCF 106 may receive information on packet flow from an application server and provide a function of determining policies, such as mobility management and session management. Specifically, the PCF 106 may support functions of, for example, supporting a unified policy framework to control network behavior, providing policy rules so that control plane function(s) (e.g., AMF, SMF, etc.) may enforce the policy rules, and implementing a front end for accessing relevant subscription information for policy determination in a user data repository (UDR).

The SMF 105 may provide a session management function, and when the UE has a plurality of sessions, each session may be managed by a different SMF. Specifically, the SMF 105 may support functions, including session management (e.g., session establishment, modification, and termination including tunnel maintenance between the UPF 104 and the (R)AN 102 nodes, UE internet protocol (IP) address allocation and management (optionally with authentication), selection and control of user plane (UP) functions, traffic steering configuration for routing traffic to appropriate destinations in the UPF 104, termination of interfaces towards policy control functions, enforcement of policies and control portions of quality of service (QoS), LI (for SM events and interfaces to the LI system), termination of a SM portion of a NAS message, DL data notification, an initiator of AN specific SM information (transferred to the (R)AN 102 via the N2 and the AMF 103), determination of a session and service continuity (SSC) mode of a session, and a roaming function. Some or all of functions of the SMF 105 may be supported within a single instance of one SMF.

The UDM 109 may store user's subscription data, policy data, and the like. The UDM 109 may include two portions, i.e., an application front end (FE) (not shown) and a UDR (not shown).

The FE may include a UDM-FE in charge of location management, subscription management, and credential processing and a PCF in charge of policy control. The UDR may store data required for the functions provided by the UDM-FE and a policy profile required by the PCF. The data stored in the UDR may include user subscription data and policy data, the user subscription data including a subscription identifier, a security credential, access and mobility-related subscription data, and session-related subscription data. The UDM-FE may access the subscription information stored in the UDR and support functions, such as authentication credential processing, user identification handling, access authentication, registration/mobility management, subscription management, short message service (SMS) management.

The UPF 104 may deliver a DL PDU received from the DN 110 to the UE 101 via the (R)AN 102 and an UL PDU received from the UE 101 via the (R)AN 102 to the DN 110. Specifically, the UPF 104 may support functions, including an anchor point for intra/inter radio access technology (RAT) mobility, an external PDU session point of interconnection to a DN, packet routing and forwarding, a user plane part of packet inspection and policy rule enforcement, LI, a traffic usage report, a UL classifier for supporting traffic flow routing to a DN, a branching point for supporting a multi-homed PDU session, QoS handling for a user plane (e.g., packet filtering, gating, UL/DL rate enforcement), UL traffic verification (service data flow (SDF) mapping between an SDF and a QoS flow), transport level packet marking in UL and DL, DL packet buffering, and DL data notification triggering. Some or all of functions of the UPF 104 may be supported within a single instance of one UPF.

The AF 107 may interwork with the 3GPP CN to provide services (e.g., functions, such as impact of an application on traffic routing, access to network capability exposure, interworking with policy frameworks for policy control, are supported).

The (R)AN 102 collectively refers to a new radio access network that supports both Evolved Universal Mobile Telecommunications System Terrestrial Radio Access (E-UTRA), which is an evolved version of 4th generation (4G) radio access technology, and a radio access technology (NR) (e.g., gNodeB (gNB)).

gNB may support functions, including functions for radio resource management (i.e., radio bearer control, radio admission control, connection mobility control, dynamic allocation of resources to a UE via UL/DL (i.e., scheduling), Internet protocol (IP) header compression, encryption and integrity protection of a user data stream, selection of the AMF upon attachment of a UE when routing to the AMF is not determined from information provided to the UE, user plane data routing to the UPF(s), a control plane information routing to the AMF, connection setup and termination, scheduling and transmission (generated from the AMF) of paging messages, scheduling and transmission (generated from the AMF or operating and maintenance (O&M)) of system broadcast information, measurement and measurement reporting configuration for mobility and scheduling, transport level packet marking in UL, session management, support for network slicing, QoS flow management and mapping to data radio bearers, support of UE in inactive mode, a NAS message distribution function, a NAS node selection function, a radio access network sharing, dual connectivity, and tight interworking between NR and E-UTRA).

The UE 101 may denote a user equipment. The user equipment may be referred to in terms of a terminal, mobile equipment (ME), mobile station (MS), and the like. In addition, the user equipment may be a portable device, such as laptops, mobile phones, personal digital assistants (PDA), smartphones, or multimedia devices, or may be a non-portable device, such as personal computers (PC) or vehicle-mounted devices.

The NEF 113 may provide a means for securely exposing services and capabilities provided by 3GPP network functions for, for example, third parties, internal exposure/re-exposure, application functionality, or edge computing. The NEF 113 may receive information (based on exposed capability (capabilities) of other NF(s)) from the other NF(s). The NEF 113 may store the received information as structured data by using a standardized interface to a data storage network function. The stored information may be re-exposed to the other NF(s) and AF(s) by the NEF 111 and used for other purposes, such as analysis.

The EASDF (not shown) may be an NF that may add, for each Fully Qualified Domain Name (FQDN), an EDNS Client Subnet (ECS) option that may be expressed as an address of a Domain Name System (DNS) server to which a DNS request is to be forwarded from a UE and as an IP subnet address that may be added when forwarding the DNS request by the UE. The EASDF (not shown) may be an NF that performs functions of receiving, from the SMF 105, a UE IP address, location information of the UE in 3GPP, a DNS message detection template, DNS message processing rules including DNS message forwarding rules, DNS message control rules, and DNS message reporting rules, processing a DNS query message received from the UE and a DNS response message received from the DNS server, and transmitting, to the SMF 105, information in the DNS message and statistic information obtained by processing the information.

The NRF 115 may support a service discovery function. The NRF 115 may receive an NF discovery request from an NF instance and provide information about the found NF instance to the NF instance. In addition, the NRF 115 may maintain available NF instances and services supported by the NF instances.

Referring to FIG. 1, for convenience of explanation, a reference model for a case in which the UE 101 accesses one DN 110 by using one PDU session. However, the disclosure is not limited thereto.

The UE 101 may simultaneously access two (i.e., local and central) data networks by using a plurality of PDU sessions. In this case, two SMFs may be selected for PDU sessions that are different from each other. However, each of the SMFs may have a capability to control both a local UPF and a central CPF within the PDU session.

In addition, the UE 101 may simultaneously access two (i.e., local and central) data networks provided within a single PDU session.

The NSSF 114 may select a set of network slice instances serving the UE 101. In addition, the NSSF 114 may determine granted network slice selection assistance information (NSSAI) and when necessary, perform mapping on subscribed single-network slice selection assistance information (S-NSSAI). In addition, the NSSF 114 may determine configured NSSAI and when necessary, perform mapping on the S-NSSAI. In addition, the NSSF 114 may determine an AMF set used to service the UE, or determine a list of candidate AMFs by inquiring the NRF 115 according to a configuration.

The NRF 115 may support a service discovery function. The NRF 115 may receive an NF discovery request from an NF instance and provide information about the found NF instance to the NF instance. In addition, the NRF 115 may maintain available NF instances and services supported by the NF instances.

TABLE 1

| | | | URSP rules URSP Rules | | | | |
|---|---|---|---|---|---|---|---|
| | | | Traffic Descriptor (TD) | Route Selection Component (RSC) | | | |
| PSI | P | IP, FQDN, APPID, CC, DNN | S-NSSAI | DNN | PDU-Type | SSC Mode | Access-Type |
| PSI = 1 | 1 | IP (10.10.10.*) | S-NSSAI#1 | DNN#1 | IPv4 | | |
| | 2 | FQDN (www.svc1.com) | S-NSSAI#2 | DNN#2 | IPv4/v6 | SSC#2 | 3GPP |
| | 3 | APPID (A-OS, com.go.tv), IP (20.20.*.*) | S-NSSAI#3 | DNN#2 | IPv4 | | |
| PSI = 2 | 4 | Connection capability (IMS) | S-NSSAI#4 | DNN#3 | IPv4 | SSC#1 | 3GPP |
| | 5 | IP (30.30.*.*), FQDN (www.svc2.com) | S-NSSAI#5 | DNN#2 | IPv4v6 | SSC#2/3 | |
| PSI = 3 | 6 | DNN#3 | S-NSSAI#6 | DNN#4 | | | |

As briefly explained in Table 1, the URSP rules include traffic descriptor information in which a terminal application or traffic generated by the terminal application may be identified, and an RSC for determining a PDU session with which the terminal application or terminal application traffic is to be associated when the identified traffic descriptor is detected.

A traffic descriptor (TD) may include contents for detecting a UE application or application traffic. As a specific example, the TD may include the elements described below.

Application descriptor: Information that may refer to an application of a UE. For example, the application descriptor may include an open service interface definition (OSID) and an application ID (APPID).

IP descriptor: Displays an IP address indicating a destination address of an IP packet transmitted by the UE. An IP 3-tuple, i.e., an IP destination address, a port number, and a protocol, may be included.

Non-IP descriptor: Information that may designate a recipient of non-IP data

Domain descriptor: Expresses a destination address of a server to which the UE connects in FQDN format.

Connection Capability (CC): Corresponds to type information that may designate characteristics of connected traffic, and may have values, such as an IP Multimedia Subsystem (IMS), a Multimedia Message Service (MIMS), and Internet.

DNN: Data network name

As described in Table 1, the RSC may include the following elements that may designate attributes of a specific PDU session such that the application or application traffic detected by the TD corresponds to the PDU session.

DNN: Data network name

S-NSSAI: Information that may designate a network slice.

PDU Session Type: Element that may designate a type of PDU-session capable of designating IPv4, IPv6, IPv4v6, Ethernet, or Non-IP.

SSC Mode: Element, which designates session and service continuity, may have a value of SSC Mode 1, 2, and 3.

Access-type: Element indicating whether a PDU session is a PDU session connected via 3GPP access or a session connected via non-3GPP access.

A plurality of URSP rules may be divided within a Policy Section (PS) of a UE Policy Container. In an embodiment of the disclosure, the plurality of URSP rules may be divided into a plurality of PSs so as not to be exceed a maximum allowed transmission size of an NAS layer. One URSP rule may not be divided into two PSs. One complete URSP rule may have to be included in one PS.

The URSP rules have priority for each rule. According to an embodiment of the disclosure, each of the URSP rules may include a URSP rule identifier capable of identifying the URSP rules. More specifically, the URSP rule identifier may refer to traffic parameters through which a UE may identify a UE application.

Figure 2:
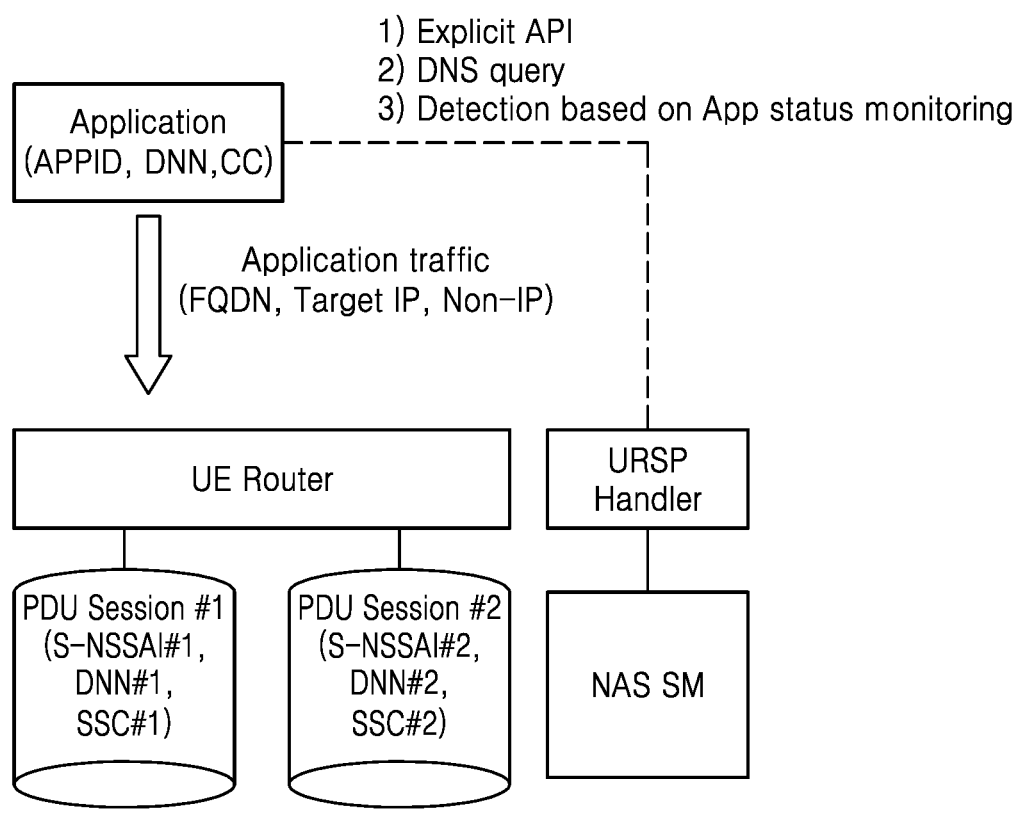
FIG. 2 is a diagram for describing a user equipment (UE) route selection policy (URSP) according to an embodiment of the disclosure.

FIG. 2 is a diagram for describing a URSP according to an embodiment of the disclosure.

More specifically, FIG. 2 is a diagram for describing an operation of a UE for detecting whether the UE complies with the URSP and applying the URSP. An operation after the UE receives the URSP is described below.

The UE may receive the URSP at a NAS layer. Thereafter, when the UE application or UE application traffic is generated, the UE may detect the generation.

A method of detecting a UE application or UE application traffic is described below.

The UE application may request a specific network through an Application Programming Interface (API) provided by a UE operating system. The API provided by the UE operating system may include direct information corresponding to a TD received at the NAS of a UE modem or information that may be mapped to the TD.

The UE application may be detected in an indirect way by the UE operating system. For example, in the Android operating system of a UE, when a UE application is installed, whether the terminal application is installed may be identified by a package manager managing the UE application. In addition, a state of the application may be identified by detecting user's behavior. Depending on the state of an application managed in the operating system, a network connection of the application may be indirectly detected by detecting a change in state, such as an event in which the application occupies a user screen (a transition event to a foreground activity).

Even when an API in which a UE application transmits a packet through a UE operating system is called, the operating system of the UE may detect the UE application or traffic generated by the UE application.

When the UE application provides an FQDN and attempts to access a service operated by the Internet or edge computing, the UE operating system may detect the FQDN provided by the UE application.

When the operating system of the UE detects the application or traffic generated by the application in a URSP handler, the URSP handler may identify a URSP rule to which the detected application corresponds based on the URSP rules received at the NAS.

When the URSP handler finds a TD complying with the URSP rules, the URSP handler may identify whether a PDU session including an RSC associated with the found TD is currently created. When the PDU session having the RSC complying with the URSP rules exists, the URSP handler may bind the corresponding UE application to the existing PDU session. Traffic generated from the bound application may be transferred by using the bound PDU session.

When a PDU session including an RSC associated with the TD found by the URSP handler does not exist, the URSP handler may initiate a PDU session create procedure for creating the corresponding PDU session. When the PDU session is created, the UE may initiate creation of a PDU session by including PDU session parameters corresponding to an RSC of the URSP rules.

According to an embodiment of the disclosure, in a case in which the URSP handler detects the application or application traffic, when URSP rules corresponding thereto exists, but a PDU session including an RSP complying with the URSP rules is not created, the URSP handler may initiate creation of a new PDU session. In addition, a session create request message may include PDU session parameters corresponding to the RSC of the URSP rules and contents that may indicate the found application. The information that may indicate the found application may be a URSP identifier, a TD, or a value of an individual traffic descriptor.

In the disclosure, for consistency of explanation, the information that may indicate the found application is described only with a URSP identifier. However, a traffic descriptor identifier or traffic descriptor value (e.g., application descriptor, DNN, IP address, FQDN, etc.) that may play a role corresponding to a role of the URSP identifier may be used.

When the UE receives a URSP compliance request indicator together with the URSP rules, the UE may report a URSP identifier complying with the detected application or application traffic when a PDU session establishment request is made.

Figure 3:
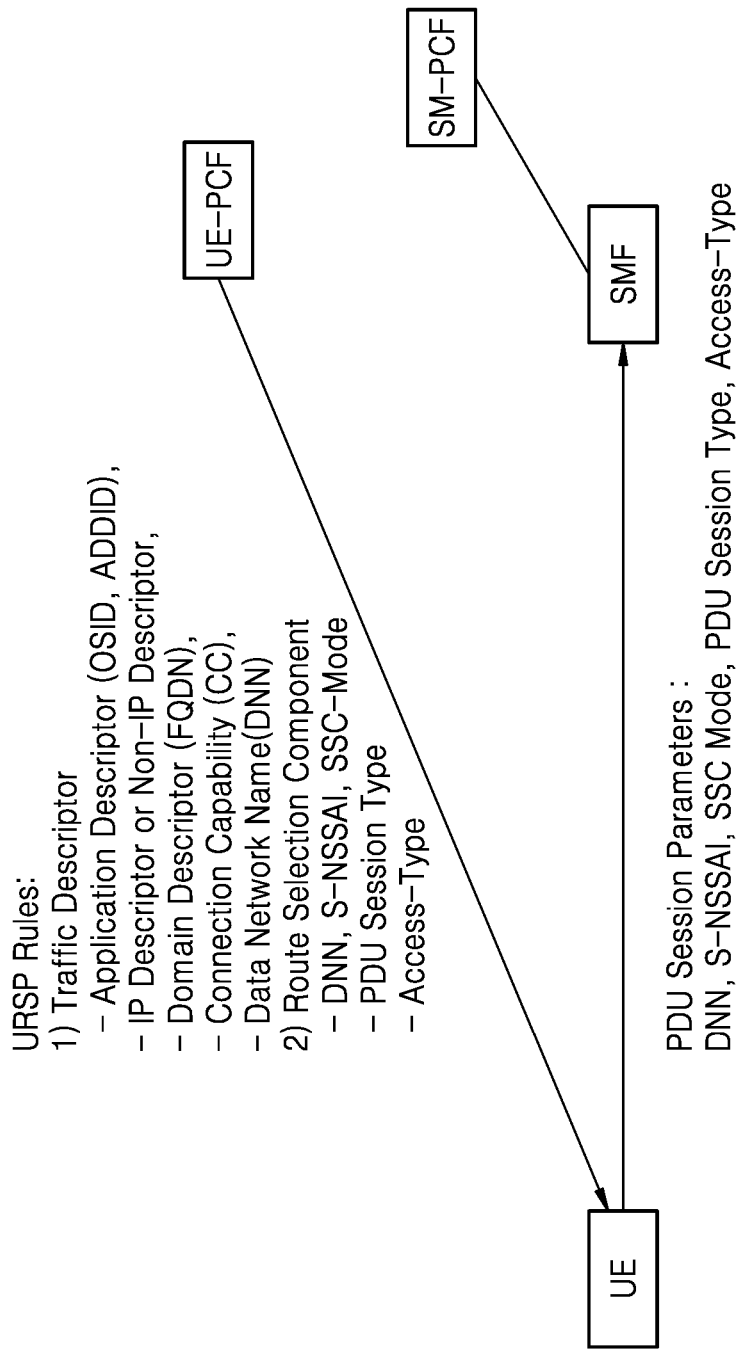
FIG. 3 is a diagram for describing a 5G core network (5GC) according to an embodiment of the disclosure.

FIG. 3 is a diagram for describing a 5G Core Network (5GC) according to an embodiment of the disclosure.

In a current network, there is no way to verify whether the application traffic of the UE complies with the URSP transferred on the network. The reason is as follows.

Referring to FIG. 3, a UE-PCF transfers URSPs rule including a TD and an RSC to the UE. When a PDU session is created, the UE may transfer information, such as DNN, S-NSSAI, SSC mode, PDU Session Type, or Access-Type, to the SMF. When the SMF receives the PDU session establishment request, it cannot be identified whether the PDU session parameters received from the UE is configured in the RSC included in the URSP. In other words, in the current network, there is no way to verify URSP compliance. This is because the UE-PCF that knows the URSP rules and the SMF that knows PDU session parameters corresponding to the RSC are not connected to each other.

Even when the SMF receives a PDU session establishment request transmitted by the UE and PDU session parameters included in the message, it may not be identified as to a rule by which the PDU session establishment request is made, whether the PDU session parameters included in the PDU session establishment request is appropriately requested, or as to detection of which application or application traffic has caused the PDU session establishment request.

In the 5GC, the SM-FCF may be connected to the SMF and perform a function of transferring, to the SMF, PCC rules and a session-related policy, the PCC rules including session-related QoS information. Different SMFs may exist for one terminal for each session of the terminal. Similarly, the SM-PCF may include a plurality of SM-PCFs. The SM-PCF may not be the same as the UE-PCF.

The UE-PCF may include a PCF that performs a role of storing and managing a UE policy. Logically, only one PCF exists for one UE. The UE-PCF may perform a function of distributing a UE policy to be transferred to the UE, e.g., a URSP and an Access Network Discovery and Selection Policy (ANDSP). Similar to the AM-PCF that manages a policy regarding Access Network and Mobility, such as a non-allowed service area and RAT. Frequency Selection Priority (RFSP), for the terminal, logically, the UE-PCF may include one PCF per UE. In an embodiment of the disclosure, the UE-PCF and the AM-PCF may be the same NF. In addition, the AM-PCF may perform the function of the UE-PCF.

Figure 4A:
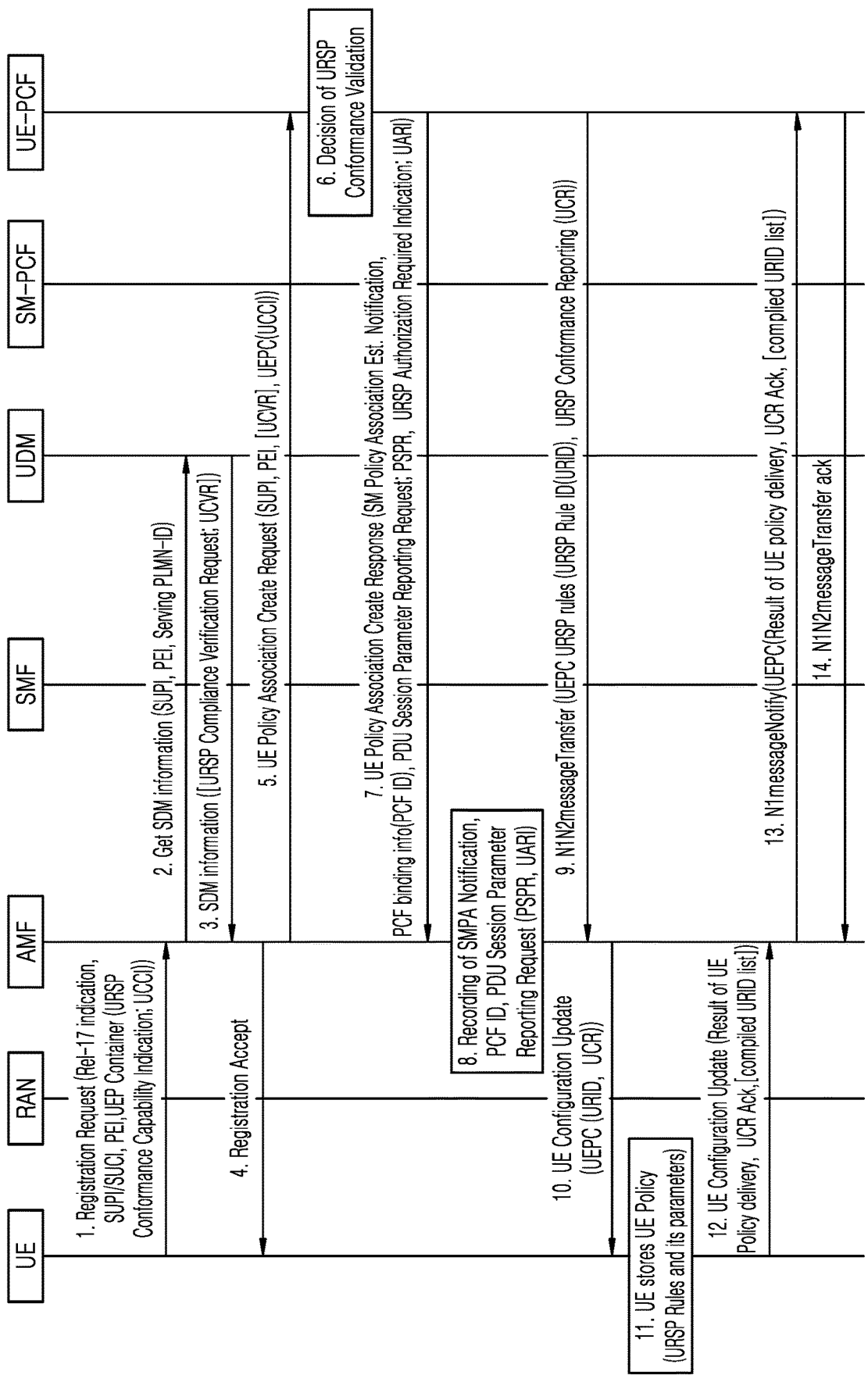
FIG. 4A is a diagram for describing in detail a method of verifying compliance with URSP, according to an embodiment of the disclosure.

FIG. 4A is a diagram for describing in detail a method of verifying whether a UE complies with URSP, according to an embodiment of the disclosure.

Referring to FIG. 4A, in operation 1, a UE complying with the URSP and supporting a report function for the URSP compliance may transmit a registration request message to the AMF. According to an embodiment of the disclosure, the registration request message may include a UE Policy Container message, and the UE Policy Container message may include a URSP compliance capability indication (UCCI).

In operations 2 and 3, while the AMF performs a registration procedure of the UE, the AMF may receive UE subscriber information from the UDM. The UE subscriber information received from the UDM may include a URSP request.

In operation 4, the AMF may transmit, to the UE, a response message to the registration request message.

In operation 5, in a registration procedure process of the UE, in order to transfer a UE policy, the AMF may transmit a UE policy connection establishment request message (or UE policy association establishment request message) to the UE-PCF. In an embodiment of the disclosure, when the AMF receives the UCCI and receives the URSP compliance verification request from the UDM, the UE policy association establishment request message may include a URSP compliance verification request by the UE. In addition, the AMF may transfer a UE Policy Container including the UCCI to the UE-PCF.

In operation 6, when the UE-PCF receives at least one of the UCCI or the URSP compliance verification request, the UE-PCF may determine whether to perform the URSP compliance verification procedure based on the received information.

In operation 7, when the UE-PCF decides to perform the URSP compliance verification procedure, the UE-PCF may transmit a UE policy association establishment response message (or UE policy connection create response message) to the AMF. In an embodiment of the disclosure, the UE policy association establishment response message may include at least one of an indicator requesting the SMF to report PDU session parameters (PDU session parameter reporting request (PSPR)) when the PDU session is created, or a URSP compliance authorization request indicator (URSP Authorization Required Indication (UARI)).

In an embodiment of the disclosure, when a SM policy association (or connection) between the SMF and the SM-PCF is establishment, the UE-PCF may transfer, to the AMF, a request for notification of an SM policy association connection establishment request (SM Policy Association Est. Notification (SMPA Notification)). In this case, the UE-PCF may transfer the SMPA Notification including PCF Binding information (PCF ID) to the AMF.

In operation 8, the AMF receiving the UE policy association establishment response message may store information, including SMPA Notification, PCF ID, PSPR, and UARI. In this case, when a PDU session establishment request is received from the corresponding UE, the PDU session establishment request may include the stored pieces of information.

In operation 9, the UE-PCF may transfer the URSP rules to the AMF. When the UE-PCF determines to perform the URSP compliance verification procedure, the URSP rules may include a URSP rule identifier (URID). The UE Policy Container may include the created URSP rules in units of Policy Sections. The UE Policy Container may include an indicator indicating the UE to perform a report regarding URSP compliance (URSP Compliance Reporting (UCR). The URSP rules may be transferred to the AMF through an N2N2message Transfer message.

In operation 10, the AMF may update a UE configuration. More specifically, the AMF may transfer the UE Policy Container received from the UE-PCF to the UE.

In operation 11, the UE may store the UE Policy Container received from the UE-PCF through the AMF. The UE Policy Container may include URSP rules, which includes a URSP identifier, and a UCR. The UE may store the received URSP identifier and the received URSP rules. When the UCR is included, the UE may identify whether the URSP rules may be complied with, whether there is any conflict between the URSP rules, and whether the parameters may be supported by URSP implementation of the current UE. In the identification process, when the UE does not support a specific URSP rule, the UE may distinguish a URSP rule that may be complied with from a URSP rule that may not be.

In operation 12, the UE may transfer, to the AMF, a response message to the UE configuration update (or the UE Policy Container received from the UE). When the UE supports the UCR, the response message to the UE configuration update may include information indicating that URSP compliance reporting is possible. In addition, a URSP rule identifier list that may comply with the URSP rules or a URSP rule identifier list (complied URSP list) capable of URSP compliance reporting may be transferred to the AMF.

In operation 13, the AMF may transfer the UE policy container received from the terminal to the UE-PCF. The UE-PCF may receive, through the AMF, a report that the URSP rules have been successfully transferred to the UE. In addition, the UE-PCF may receive a response of whether the UE complies with the URSP and a response supporting URSP compliance reporting (UCR Ack). The UE-PCF may determine whether to perform a PSPR procedure or a UARI procedure by using information included in the received message, self-configuration information, operator policy information, and subscriber information, such as UARI received from the UDM.

In operation 14, the UE-PCF may transfer an N1N2messageTransfer ack, i.e., a response message to operation 13, to the AMF.

Figure 4B:
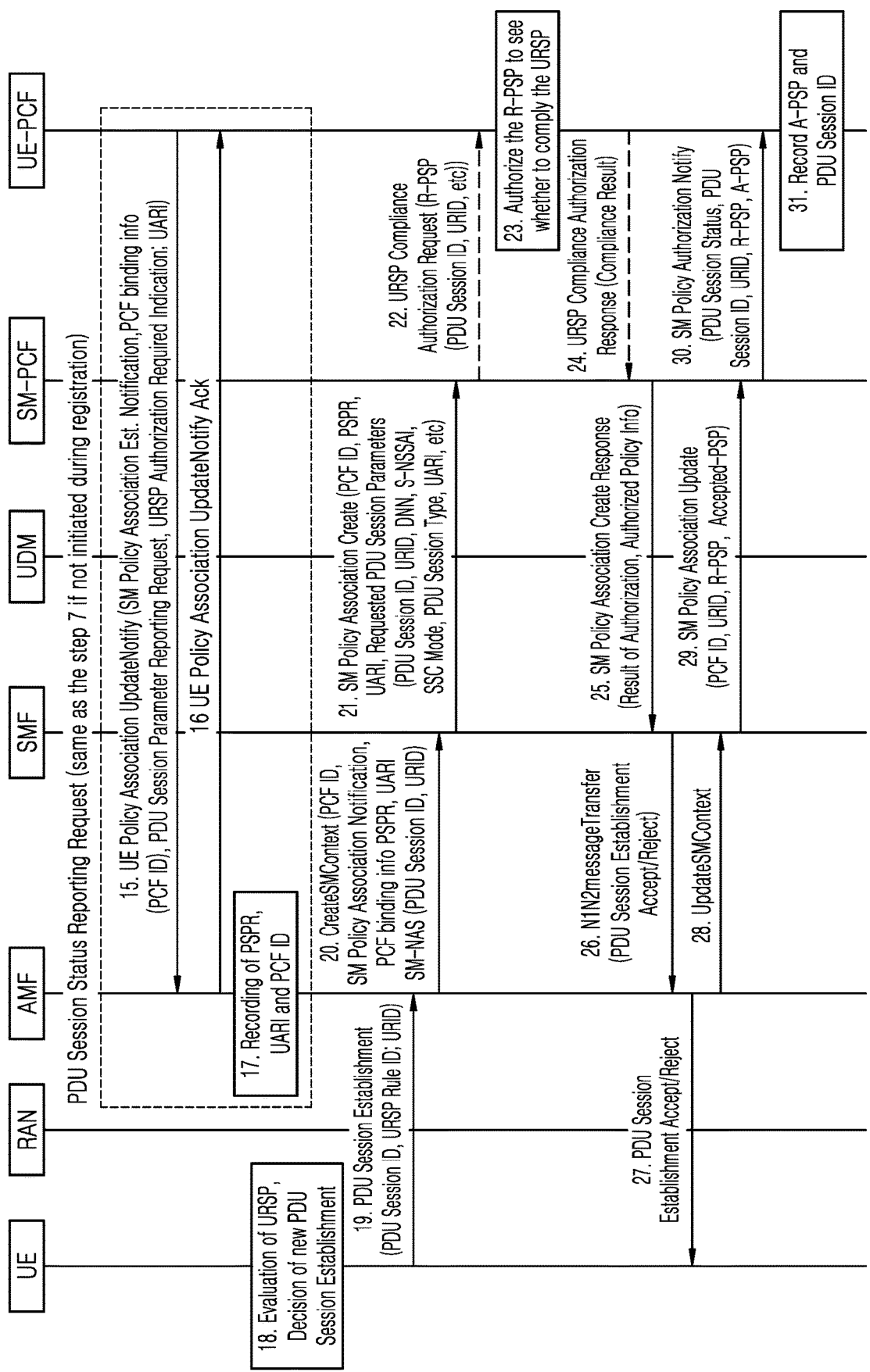
FIG. 4B is a diagram for describing in detail a method of verifying whether a UE complies with URSP, according to an embodiment of the disclosure.

FIG. 4B is a diagram for describing in detail a method of verifying whether the UE complies with URSP, according to an embodiment of the disclosure.

More specifically, FIG. 4B is a diagram for describing operations after operation 14 of FIG. 4A.

In operation 15, when the UE-PCF determines whether to perform a PSPR or a UARI procedure, the UE-PCF may transmit a UE policy association update notification message to the AMF. The UE policy association update notification message may include the information described below.

SM Policy Association Est. Notification; SMPA Notification: When SM policy association is established between the SMF and the SM-PCF, notification request for SM policy association connection establishment reporting the establishment. When the UE policy association update notification message includes an SMPA Notification, the UE-PCF may include PCF binding information (PCF ID) in the SMPA Notification and transfer the SMPA Notification.

PDU Session Parameter Reporting Request; PSPR: Indicator requesting the SMF to report PDU session parameters to the UE-PCF through the SM-PCF when the PDU session is created. When the UE-PCF and the SM-PCF are implemented as one PCF, the SMF may report the PSPR and the PDU session parameters to the SM-PCF. When the SM-PCF and the UE-PCF are implemented as two different NFs, the SMF may report the PDU session parameters to the SM-PCF, and may further include address information of the UE-PCF and an indicator requesting the address information so that the SM-PCF may report the PDU session parameters to the UE-PCF.

URSP Authorization Required Indication; UARI: Indicator that transmits a URSP compliance authorization request to the SMF.

In an embodiment of the disclosure, a UE policy association update notification message may include at least one of a PSPR or a UARI.

In operation 16, the AMF may transfer a response message to the UE policy association update notification message to the UE-PCF.

In operation 17, the AMF may store the PSPR, the UARI, and the PCF ID. In an embodiment of the disclosure, when a PDU session establishment request is received from the corresponding UE, the AMF may transfer a session create request including the stored information to the SMF.

In operation 18, the UE may evaluate the URSP and determine PDU session parameters. The UE may receive the URSP rules included in the UE Policy Container through operation 11. As described in Table 1, the URSP rules include TD information in which a UE application or traffic generated by the UE application may be identified, and an RSC for determining, when the identified TD is detected, a PDU session with which the UE application or UE application traffic is associated. Thereafter, as described above in detail with reference to FIG. 2, the UE may detect the application or application traffic and perform a URSP evaluation procedure.

In operation 19, URSP rules corresponding to the detected application or application traffic exists, but when a PDU session including the RSC that complies with the URSP rules is not established (in the UE), the UE may determine establishment of a PDU session. When the UE determines establishment of the PDU session and the determination of the PDU session is a determination occurring due to the URSP rules, the PDU session establishment request message may include a URID or URSP rule identification information corresponding to the URID. In an embodiment of the disclosure, when the UE receives the URSP rules and the UCR in operation 10, the PDU session establishment request message may include the URSP rule identification information.

The PDU session establishment request message may be included in an SM NAS message. In addition, the PDU session establishment request message may be transferred to the AMF through the RAN. The PDU session establishment request message may include a URSP rule identifier, a PDU session identifier allocated by the UE, and PDU session parameters that identify attributes of other PDU sessions. In an embodiment of the disclosure, the PDU session parameters may include information, such as S-NSSAI, DNN, SSC Mode, Access-Type (3GPP or non-3GPP), and PDU Session Type.

In operation 20, the AMF may transmit an SM context create request message to the SMF. More specifically, when the AMF receives the PSPR and the UARI in operation 8 or 17, the AMF may select the SMF and transmit the SM context create request message to the selected SMF.

The SM context create request message may include a PDU session establishment request message received from the UE, PCF binding information received from the UE-PCF, the binding information including a PSPR, UARI, and PCF ID, and a notification request in case of SM policy connection.

The SMF receiving the SM context create request message may identify the PCF binding information and select the SM-PCF.

The SM-PCF and the UE-PCF may exist in different NFs or in the same NF, depending on implementation. A case in which the selected SM-PCF is implemented in the same NF as the UE-PCF is described separately. Hereinafter, a case in which the SM-PCF and the UE-PCF are separated from each other, as shown in FIG. 4B is described.

When the SMF receives the PSPR, the SMF may include all parameters of the PDU session establishment request message received from the UE in the PSP container and transfer the PSP container to the SM-PCF. In addition, the SMF may also provide the PCF binding information including the UE-PCF ID, together with the PSP container so that the SM-PCF may report the PSPR to the UE-PCF. In an embodiment of the disclosure, the SMF may not include the PDU session parameters received from the UE in the PSP container and may transfer the PDU session parameters separately.

When the SMF receives the UARI, the SMF may transfer the URSP compliance verification request to the SM-PCF. The URSP compliance verification request is an indicator by which the SM-PCF contacts the UE-PCF and requests to request receipt of authorization as to whether the PDU session establishment request complies with the URSP. The URSP compliance verification request may be a UARI or a new indicator corresponding to the UARI.

The SMF may transmit a PSP container to the SM-PCF, the PSP container including the URID or PDU session parameters included in the received PDU session establishment request message.

When the SMF receives the URID, the SMF may determine that the PDU session establishment request message is generated by the URSP rules, and transmit, to the SM-PCF, a URSP compliance verification request for authorizing whether the PDU session establishment request is appropriate.

A condition in which the SMF transmits the URSP compliance verification or an indicator corresponding thereto to the SM-PCF is described below.

Condition 1: When the UARI transferred by the UE-PCF is received through the AMF Condition 2: When the PDU session establishment request message received from the UE includes URSP identification information for URSP compliance or information necessary for verifying whether a UE complies with URSP Condition 3: When both conditions 1 and 2 are true A case in which the SM-PCF and the UE-PCF are implemented in different NFs is described above. Meanwhile, according to an embodiment of the disclosure, the SM-PCF and the UE-PCF may be implemented in the same NF. In this case, an operation between the SM-PCF and the UE-PCF, e.g., operations 22, 24, and 30, may not be performed separately. In addition, operations of operations 23 and 31 may be performed based on information received through operation 21 and 29, in the NF in which the SM-PCF and the UE-PCF are implemented.

In the disclosure, the UE-PCF may include a PCF managing a single UE. In a 5GC network structure, the UE-PCF includes a logical PCF that exists only one per UE. The UE-PCF described above may correspond to an AM-PCF, which manages an access & mobility policy In operation 21, the SMF may transfer the SM policy association create message to the SM-PCF. When the SM-PCF receives the UARI, a URSP compliance authorization (UE route selection policy compliance authorization) request message may be transmitted. The URSP compliance authorization request may include a request for verifying whether a PDU session establishment request from the current UE complies with the URSP rules installed in the UE.

In operation 22, the UE-PCF may receive a URSP compliance authorization request from the SM-PCF.

In operation 23, the UE-PCF may determine whether the PDU session establishment request complies with the URSP rules. More specifically, the UE-PCF may determine whether the PDU session establishment request complies with the URSP rules through the PDU session parameters and URSP rule identification information.

The UE-PCF indicates the UCR to report the URID, but when the UE does not transmit the corresponding URID and the PDU session parameters include an RSC that is not included in the URSP rules transferred from the UE-PCF to the UE, it may be determined that the PDU session establishment request does not comply with the URSP. When the UE-PCF determines that the PDU session establishment request does not comply with the URSP, the UE-PCF may reject the URSP compliance authorization request.

In operation 24, the UE-PCF may transfer, to the SM-PCF, a response to the URSP compliance authorization including a determination result of whether the PDU session establishment request complies with the URSP rules.

In operation 25, the SM-PCF may determine an SM policy based on the received response to the URSP compliance authorization. The SM-PCF may transfer a result of the URSP compliance authorization to the SMF.

The SMF may determine whether a PDU session establishment is accepted or rejected according to the URSP compliance authorization result. When the PCF (SM-PCF or UE-PCF) does not authorize establishment of a PDU session not complying with the URSP rules, the SMF may reject establishment of the PDU session. When the SMF authorizes establishment of the PDU session, the SMF may determine attributes of the PDU session according to PDU session parameters transmitted by the UE, subscriber information of the UE, session-related parameters received from the PCF, and a local configuration defined by the SMF itself, and determine the determined attributes as authorized PDU session parameters.

In operation 26, the SMF may transfer a PDU session establishment acceptance or rejection message to the AMF according to whether the PDU session establishment is authorized.

In operation 27, the AMF may transfer a PDU session establishment authorization or rejection message to the UE.

In operation 28, after the AMF receives a response from the UE, the AMF may transfer an SM context update request to the SMF.

In operation 29, the SMF may complete establishment of the PDU session and transfer a policy update request therefor to the SM-PCF. When the SMF receives the PSPR, the SMF may transfer, to the SM-PCF, PDU session parameters requested by the UE and PDU session parameters finally authorized by the SM.

The PDU session parameters (PSP) may be individually transferred, or may be included in the PSP Container and transferred to the SM-PCF. The PSP transferred to the SM-PCF from the SMF may be transferred to the SM-PCF as separate parameters, such as required PSP requested by the UE and accepted PSP finally authorized by the SMF.

In operation 30, the SM-PCF may search for the UE-PCF through the PCF binding information transmitted by the SMF and transfer an SM policy authorization notification message to the UE-PCF.

When the SM policy update request includes information corresponding to the PSPR, the SM-PCF may transfer the requested PSP and the accepted PSP to the UE-PCF. The requested PSP information may include URSP rule identification information transmitted by the UE.

To notify the accepted PSP, the SM-PCF may transfer an SM policy authorization notification message after the message is received in operation 21.

In operation 31, the UE-PCF may store or record A-PSP and R-PSP. The UE-PCF may use the R-PSP as information for later verifying URSP compliance by the UE.

The UE-PCF receiving the A-PSP may use the A-PSP for a tracking purpose of identifying which traffic is routed to which PDU session by the UE, for each of PDU sessions created by the UE.

Figure 5:
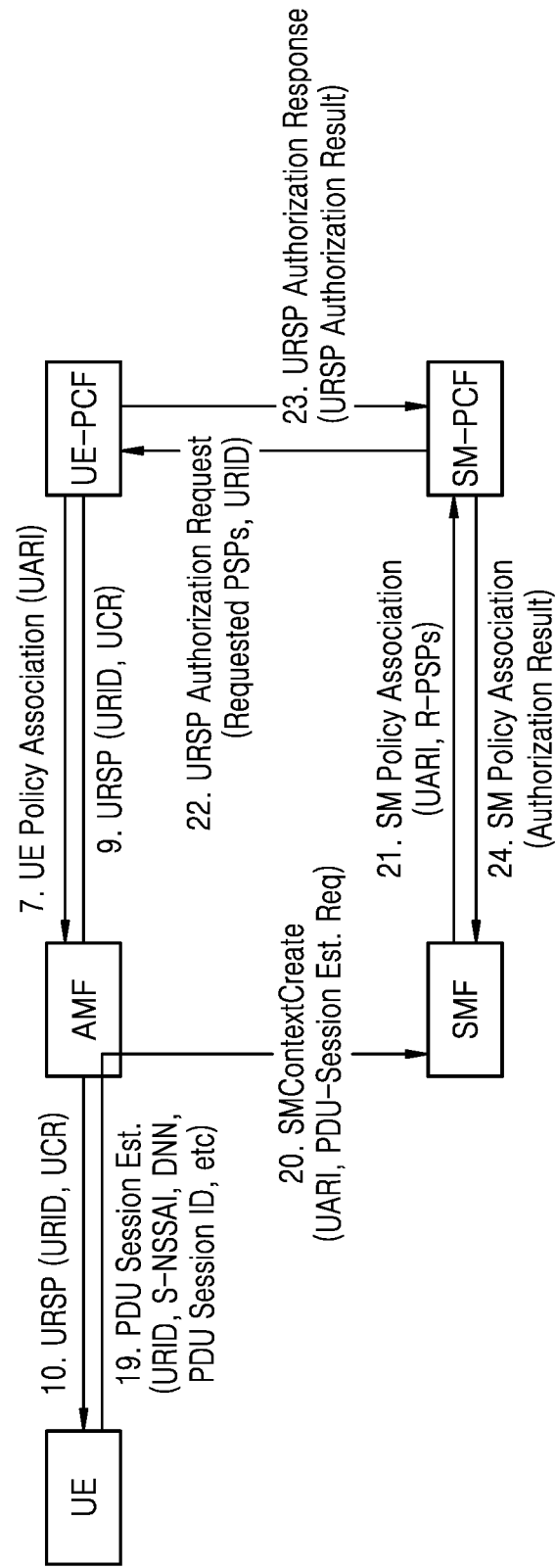
FIG. 5 is a diagram for describing a method of verifying whether a UE complies with URSP, according to an embodiment of the disclosure.

FIG. 5 is a diagram for describing a method of verifying whether a UE complies with URSP, according to an embodiment of the disclosure.

More specifically, FIG. 5 is a diagram for describing a procedure for identifying, by the UE-PCF, whether the UE performs a PDU session establishment request through the URSP rule identification information.

Operations shown in FIG. 5 corresponds to the operations described with reference to FIGS. 4A and 4B. Operations not shown in FIG. 5 refer to the description of FIGS. 4A and 4B.

In operation 7, the UE-PCF may determine to perform authorization as to URSP compliance and transfer the UARI to the AMF.

In operation 9, the UE-PCF may transfer the URSP rules, which include a URID, and a URSP compliance request.

In operation 10, the AMF may transfer the URSP rules, which include the URID, and the URSP compliance request to the UE.

In operation 19, the UE may detect an application and evaluate URSP. When a PDU session establishment condition is satisfied according to the URSP rules, the UE may transmit a PDU session establishment request to the AMF. In this case, the PDU session establishment request message may include a URID. In addition, the PDU session establishment request message may be included in an SM NAS message.

In operation 20, the AMF may transmit an SM context create request message to the SMF. In an embodiment of the disclosure, when the AMF receives the UARI in operation 7, the SM context create request message may include the UARI.

In operation 21, the SMF may transmit the SM policy association create request message to the SM-PCF. The SM policy association create request message may include a UARI received from the AMF and requested PDU session parameters received from the UE.

In operation 22, the SM-PCF receiving the UARI may transmit, to the UE-PCF, a URSP authorization request for verifying whether the SM-PCF complies with the URSP.

In operation 24, the UE-PCF may transfer a response to the SM-PCF based on verifying whether the PDU session request complies with the URSP through the requested PSP and the URID value.

In operation 25, the SM-PCF may transmit an SM policy association create response message to the SMF. The SM policy association create response message may include an authorization result value received from the UE-PCF by the SM-PCF. When the PDU session establishment request does not comply with the URSP rules, an authorization result value may be to reject the request from the UE.

Figure 6:
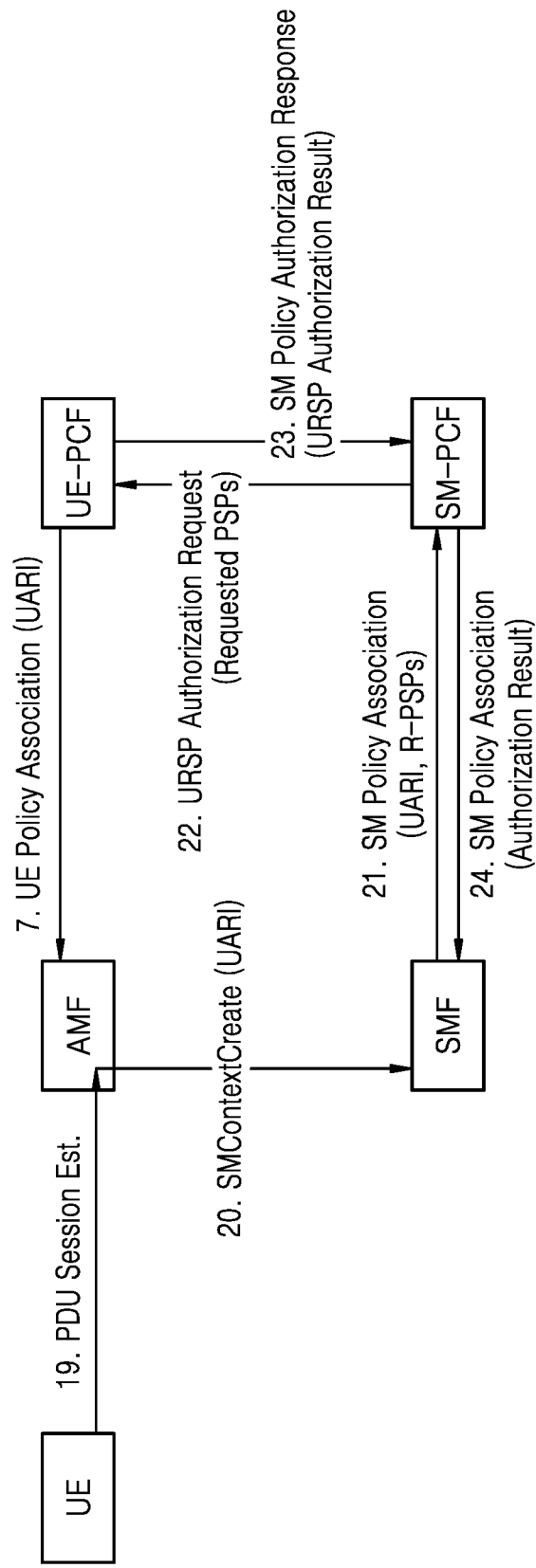
FIG. 6 is a diagram for describing a method of verifying whether a UE complies with URSP, according to an embodiment of the disclosure.

FIG. 6 is a diagram for describing a method of verifying whether a UE complies with URSP, according to an embodiment of the disclosure.

More specifically, FIG. 6 is a diagram for describing a procedure for identifying, by the UE-PCF without being dependent on the UE, whether the UE has made the PDU session establishment request.

Operations shown in FIG. 6 corresponds to the operations described with reference to FIGS. 4A and 4B. Operations not shown in FIG. 6 refer to the description of FIGS. 4A and 4B.

In operation 7, the UE-PCF may determine to perform authorization as to URSP compliance and transfer the UARI to the AMF.

In operation 19, the UE may detect an application and evaluate the URSP. When a PDU session create condition is satisfied according to the URSP rules, the UE may transmit a PDU session establishment request to the SMF through the AMF.

In operation 20, the AMF may transmit an SM context create request message to the SMF. In an embodiment of the disclosure, when the AMF receives the UARI in operation 7, the SM context create request message may include the UARI.

In operation 21, the SMF may transmit the SM policy association create request message to the SM-PCF. The SM policy association create request message may include a UARI received from the AMF and requested PDU session parameters received from the UE.

In operation 22, the SM-PCF receiving the UARI may transmit, to the UE-PCF, a URSP authorization request for verifying whether the SM-PCF complies with the URSP.

In operation 24, the UE-PCF may transfer a response to the SM-PCF based on based on verify whether the PDU session request complies with the URSP through the requested PSP.

In operation 25, the SM-PCF may transmit an SM policy association create response message to the SMF. The SM policy association create response message may include an authorization result value received from the UE-PCF by the SM-PCF. When the PDU session establishment request does not comply with the URSP rules, an authorization result value may be to reject the request from the UE.

Figure 7:
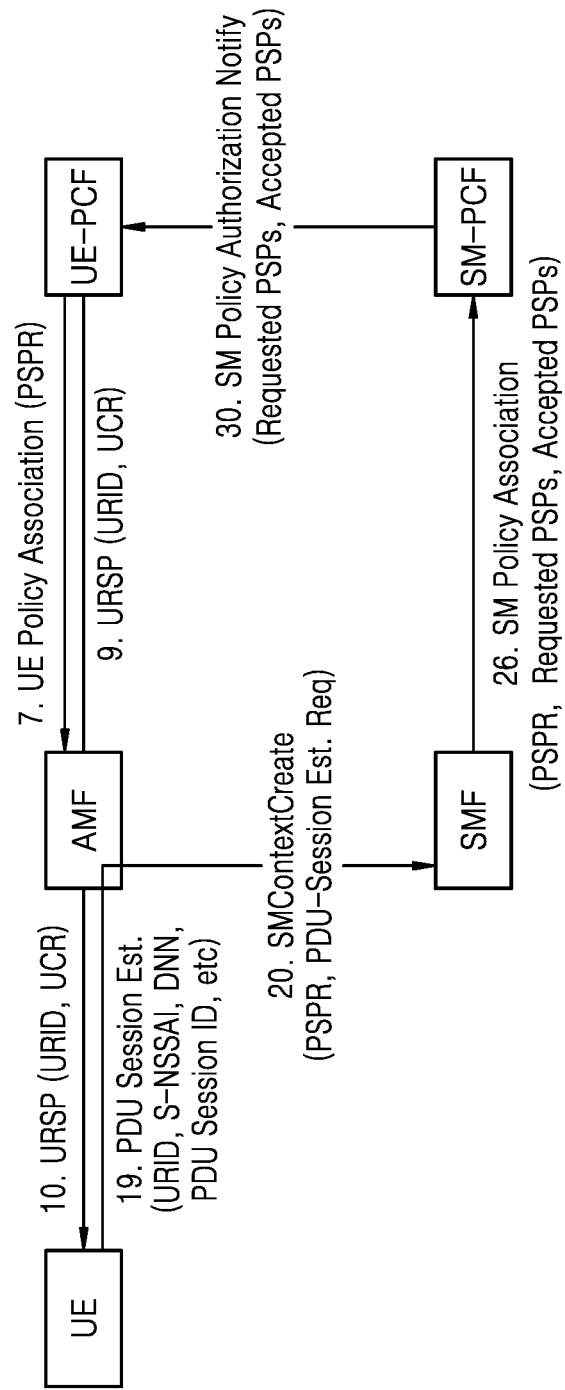
FIG. 7 is a diagram for describing a method of verifying whether a UE complies with URSP, according to an embodiment of the disclosure.

FIG. 7 is a diagram for describing a method of verifying whether a UE complies with URSP, according to an embodiment of the disclosure.

More specifically, FIG. 7 shows a case in which the UE-PCF includes URSP rule identification information included in the URSP rules in the PDU session request so that the UE performs a session request, and the UE-PCF transmits a PSPR indicator that allows PDU session parameters and URSP rule identification information associated therewith to be reported by the SMF. Accordingly, the UE-PCF may perform a procedure for collecting PDU session parameters and URSP rule identification information and verifying whether the UE complies with the URSP rules.

Operations shown in FIG. 7 corresponds to the operations described with reference to FIGS. 4A and 4B. Operations not shown in FIG. 7 refer to the description of FIGS. 4A and 4B.

In operation 7, the UE-PCF may determine to perform a URSP compliance procedure and transmit the PSPR to the SMF through the AMF. The SMF may transfer, to the SM-PCF, a PSPR indicator requesting to report the accepted PDU session parameters finally determined by the SMF and the PDU session parameters. The PSPR indicator may include a request indicating both the PDU session parameters requested by the UE and the accepted PDU session parameters finally determined by the SMF. In an embodiment of the disclosure, the PSPR indicator may perform a request indicating to individually and separately report the PDU session parameters and the accepted PDU session parameters finally determined by the SMF.

In operation 10, the AMF may transfer the URSP rules, which include the URSP rule identifier, and the URSP compliance request to the UE.

In operation 19, the UE may detect an application and evaluate the URSP. When a PDU session create condition is satisfied according to the URSP rules, the UE may transmit a PDU session establishment request to the AMF. In this case, the PDU session establishment request message may include a URID.

The AMF may select the SMF capable of providing the PSPR based on the DNN transmitted by the UE, the SNS-SAI, and the PSPR received from the UE-PCF.

In operation 20, the AMF may transmit an SM context create request message to the SMF. In an embodiment of the disclosure, the SM context create request message may include the PSPR.

In operation 21, the SMF may transfer, to the SM-PCF, the SM policy connection establishment request message or SM policy update request message. The SM policy connection establishment request message or SM policy update request message may include a PDU session parameter list, URID, PSPR, and UE-PCF identification information (or address information).

In operation 30, the SM-PCF may transfer an SM policy authorization notification message to the UE-PCF. The SM policy authorization notification message may include a PDU session parameter list, URID, and a PDU session parameter list finally authorized by the SMF. In an embodiment of the disclosure, operation 30 may be performed even when the SM policy association create request is received.

Figure 8:
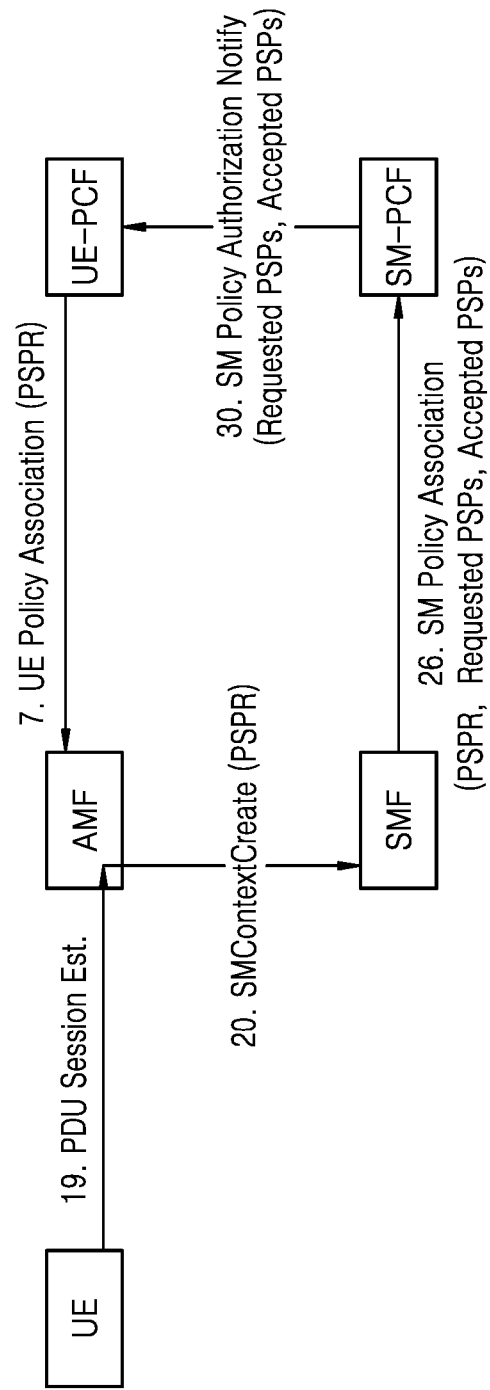
FIG. 8 is a diagram for describing a method of verifying whether a UE complies with URSP, according to an embodiment of the disclosure.

FIG. 8 is a diagram for describing a method of verifying whether a UE complies with URSP, according to an embodiment of the disclosure.

More specifically, FIG. 8 is a diagram for describing a procedure for identifying whether the UE complies with the URSP rules by allowing, by the UE-PCF, the SMF to report the PDU session parameters through the AMF without being dependent on the UE, and collecting the PDU session parameters by the UE-PCF.

Operations shown in FIG. 8 corresponds to the operations described with reference to FIGS. 4A and 4B. Operations not shown in FIG. 8 refer to the description of FIGS. 4A and 4B.

In operation 7, the UE-PCF may determine to perform a URSP compliance procedure and transmit the PSPR to the SMF through the AMF. The SMF may transfer, to the SM-PCF, a PSPR indicator requesting to report the accepted PDU session parameters finally determined by the SMF and the PDU session parameters. The PSPR indicator may include a request indicating both the PDU session parameters and the accepted PDU session parameters finally determined by the SMF. In an embodiment of the disclosure, the PSPR indicator may perform a request indicating to individually separately report the PDU session parameters and the accepted PDU session parameters finally determined by the SMF.

The UE-PCF may transfer the URSP rules including the existing TD and RSC to the UE. In an embodiment of the disclosure, the URID and UCR described in operation 10 of FIG. 4A may not be included in the URSP rules.

In operation 19, the UE may detect an application and evaluate the URSP. When a PDU session establishment condition is satisfied according to the URSP rules, the UE may transmit a PDU session establishment request to the AMF. In this case, the PDU session establishment request message may not include a URID.

The AMF may select the SMF capable of providing the PSPR, based on the DNN transmitted by the UE, the S-NSSAI, and the PSPR received from the UE-PCF.

In operation 20, the AMF may transmit an SM context create request message to the SMF. In an embodiment of the disclosure, the SM context create request message may include the PSPR.

In operation 21, the SMF may transfer, to the SM-PCF, the SM policy connection establishment request message or SM policy update request message. The SM policy connection establishment request message or SM policy update request message may include a PDU session parameter list, PSPR, and UE-PCF identification information (or address information).

In operation 30, the SM-PCF may transfer an SM policy authorization notification message to the UE-PCF. The SM policy authorization notification message may include a PDU session parameter list and a PDU session parameter list finally authorized by the SMF. In an embodiment of the disclosure, operation 30 may be performed even when the SM policy association create request is received.

Figure 9:
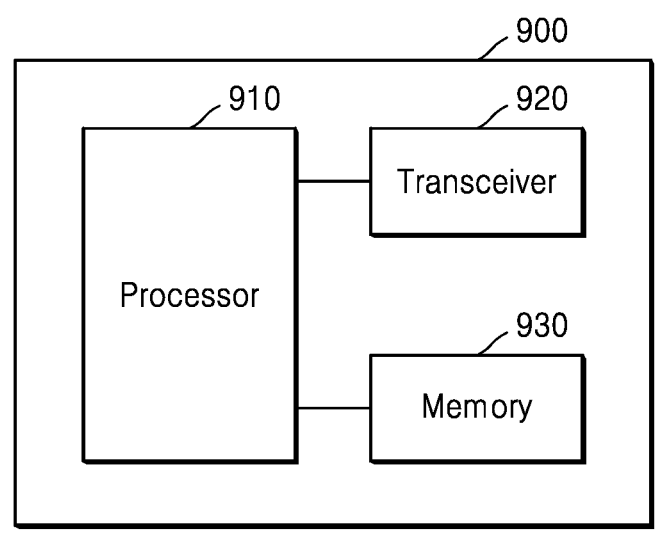
FIG. 9 is a diagram for describing a UE according to an embodiment of the disclosure.

FIG. 9 is a diagram for describing a UE according to an embodiment of the disclosure.

Referring to FIG. 9, a UE 900 may include a processor 910, a transceiver 920, and a memory 930. However, all of the elements shown are not essential, and thus, the UE 900 may be implemented with more or less elements than shown. In addition, the processor 910, the transceiver 920, and the memory 930 may be implemented in a single chip in some cases.

The processor 910 may include one or more processors or other processing devices that control the proposed function, processes, and/or methods disclosed in the disclosure. Operations of the UE 900 may be implemented by the processor 910.

The transceiver 920 may include an RF transmitter for up-converting and amplifying a transmitted signal, and an RF receiver for down-converting a frequency of a received signal. However, according to an embodiment of the disclosure, the transceiver 920 may be implemented by more or less components than shown.

The transceiver 920 may be connected to the processor 910 for transmitting and/or receiving a signal. The signal may include control information and data. In addition, the transceiver 920 may receive a signal through a radio channel and output the signal to the processor 910. The transceiver 920 may transmit a signal output from the processor 910 through a radio channel.

The memory 930 may store control information or data included in the signal obtained by the UE 900. The memory 930 may be connected to the processor 910 and may store at least one command or a protocol or a parameter for the disclosed function, process, and/or method. The memory 930 may include read-only memory (ROM), random access memory (RAM), a hard disk, compact disc read-only memory (CD-ROM), digital versatile disc (DVD), and/or other storage devices.

Figure 10:
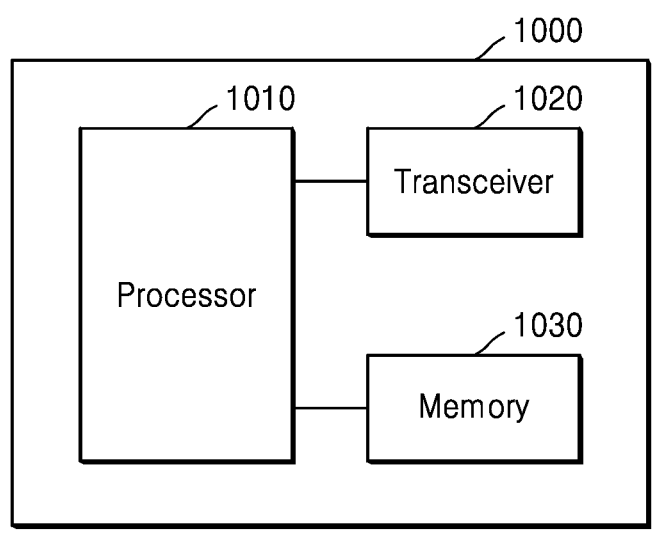
FIG. 10 is a diagram for describing a network entity according to an embodiment of the disclosure.

FIG. 10 is a diagram for describing a network entity according to an embodiment of the disclosure.

Referring to FIG. 10, a network entity 1000 may include a processor 1010, a transceiver 1020, and a memory 1030. However, all of the elements shown are not essential, and thus, the network entity 1000 may be implemented with more or less elements than shown. In addition, the processor 1010, the transceiver 1020, and the memory 1030 may be implemented in a single chip in some cases.

The processor 1010 may include one or more processors or other processing devices that control the function, processes, and/or methods disclosed in the disclosure. Operations of the network entity 1000 may be implemented by the processor 1010.

The 1020 may include an RF transmitter for up-converting and amplifying a transmitted signal, and an RF receiver for down-converting a frequency of a received signal. However, according to an embodiment of the disclosure, the transceiver 1020 may be implemented by more or less components than shown.

The transceiver 1020 may be connected to the processor 1010 for transmitting and/or receiving a signal. The signal may include control information and data. In addition, the transceiver 1020 may receive a signal through a radio channel and output the signal to the processor 1010. The transceiver 1020 may transmit a signal output from the processor 1010 through a radio channel.

The memory 1030 may store control information or data included in the signal obtained by the network entity 1000. The memory 1030 may be connected to the processor 1010 and may store at least one command or a protocol or a parameter for the disclosed function, process, and/or method. The memory 1030 may include ROM, RAM, a hard disk, CD-ROM, DVD, and/or other storage devices.

According to an embodiment of the disclosure, it may be identified whether a UE establishes a PDU session according to a USRP received from a PCF (UE-PCF) in charge of the UE and whether the PDU session is requested by including appropriate PDU session parameters for the PDU session.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a policy control function (PCF) in a wireless communication system, the method comprising:
    receiving, from a user equipment (UE) via an access management function (AMF), indication of UE capability for reporting UE route selection policy (URSP) rule enforcement; and
    transmitting, to the UE, a URSP rule which includes indication for the UE to perform a report regarding the URSP rule enforcement and a traffic descriptor including connection capability,
    wherein the report regarding the URSP rule enforcement is used to verify whether the URSP rule of the UE is complied with.

2. The method of claim 1, further comprising:
receiving, based on session management (SM) policy association procedure, the traffic descriptor which is transmitted from the UE to a session management function (SMF).

3. The method of claim 1,
wherein, in case that the PCF is a PCF for the UE, the traffic descriptor is received via a PCF for a protocol data unit (PDU) session to the PCF for the UE,
wherein the PCF for the UE provides at least one of UE policy control or access and mobility related policy control, and
wherein the PCF for the PDU session provides session management policy control.

4. The method of claim 3, further comprising:
receiving, from the PCF for the PDU session, PDU session parameters includes requested data network name (DNN); and
verifying whether the URSP rule of the UE is complied with, based on the requested DNN.

5. A method performed by an access management function (AMF) entity-in a wireless communication system, the method comprising:
receiving, from a user equipment (UE), indication of UE capability for reporting UE route selection policy (URSP) rule enforcement;
transmitting, to a policy control function (PCF), the indication;
receiving, from the PCF, a URSP rule which includes indication for the UE to perform a report regarding the URSP rule enforcement and a traffic descriptor including connection capability, wherein the report regarding the URSP rule enforcement is used to verify whether the URSP rule of the UE is complied with; and
transmitting, to the UE, the URSP rule.

6. The method of claim 5, further comprising:
receiving, from the UE, the traffic descriptor; and
transmitting, to a session management function (SMF), the traffic descriptor.

7. A policy control function (PCF) entity in a wireless communication system, the PCF entity comprising:
a transceiver; and
at least one processor coupled with the transceiver and configured to:
receive, from a user equipment (UE) via an access management function (AMF) entity, indication of UE capability for reporting UE route selection policy (URSP) rule enforcement,
transmit, to the UE, a URSP rule which includes indication for the UE to perform a report regarding the URSP rule enforcement and a traffic descriptor including connection capability,
wherein the report regarding the URSP rule enforcement is used to verify whether the URSP rule of the UE is complied with.

8. The PCF of claim 7, wherein at least one processor is further configured to:
receive, based on session management (SM) policy association procedure, the traffic descriptor which is transmitted from the UE to a session management function (SMF).

9. The PCF of claim 7, in case that the PCF is a PCF for the UE, the traffic descriptor is received via a PCF for a protocol data unit (PDU) session to the PCF for the UE,
wherein the PCF for the UE provides at least one of UE policy control or access and mobility related policy control, and
wherein the PCF for the PDU session provides session management policy control.

10. The PCF of claim 9, wherein the processor is further configured to:
receive, from the PCF for the PDU session, PDU session parameters includes requested data network name (DNN), and
verify whether the URSP rule of the UE is complied with, based on the requested DNN.

* * * * *